United States Patent [19]

Takahashi

[11] Patent Number: 5,423,602
[45] Date of Patent: Jun. 13, 1995

[54] FLUID PRESSURE CONTROL VALVE

[75] Inventor: Hideaki Takahashi, Atsugi, Japan

[73] Assignee: Unisia Jecs Corporation, Kanagawa, Japan

[21] Appl. No.: 78,686

[22] Filed: Jun. 21, 1993

[30] Foreign Application Priority Data

Jun. 23, 1992 [JP] Japan .............................. 4-043475 U
May 31, 1993 [JP] Japan .............................. 5-028739 U

[51] Int. Cl.6 .............................................. B60T 8/36
[52] U.S. Cl. .................................. 303/119.2; 251/51; 251/129.19
[58] Field of Search ............... 303/119.2, 116.1, 9.75; 251/51, 55, 129.19, 129.15

[56] References Cited

U.S. PATENT DOCUMENTS

| 3,563,217 | 2/1971 | Bartels | 251/55 X |
| 3,726,317 | 4/1973 | Moen | 251/51 X |
| 3,970,282 | 7/1976 | Hansen | 251/129.19 X |
| 4,783,051 | 11/1988 | Gibas | 251/129.19 |
| 5,029,807 | 7/1991 | Fuchs | 251/129.19 X |

FOREIGN PATENT DOCUMENTS

| 4016749 | 11/1991 | Germany | 303/119.2 |
| 3-41278 | 2/1991 | Japan . | |
| 9204214 | 3/1992 | WIPO | 303/119.2 |

Primary Examiner—Robert J. Oberleitner
Assistant Examiner—Lee W. Young
Attorney, Agent, or Firm—Lowe, Price, LeBlanc & Becker

[57] ABSTRACT

A fluid pressure control valve suitable for a pressure intensifying valve of an automotive anti-skid brake control system comprises a valve housing, a solenoid attached to the valve housing, a plunger slidably enclosed in the valve housing and having a main valve portion at one end thereof to close the valve in response to energizing of the solenoid, and a return spring disposed in the housing for biasing the plunger in a valve opening direction. The pressure control valve includes a dashpot like device arranged at the other end of the plunger, for dampening a motion of the plunger in a valve opening direction.

14 Claims, 2 Drawing Sheets

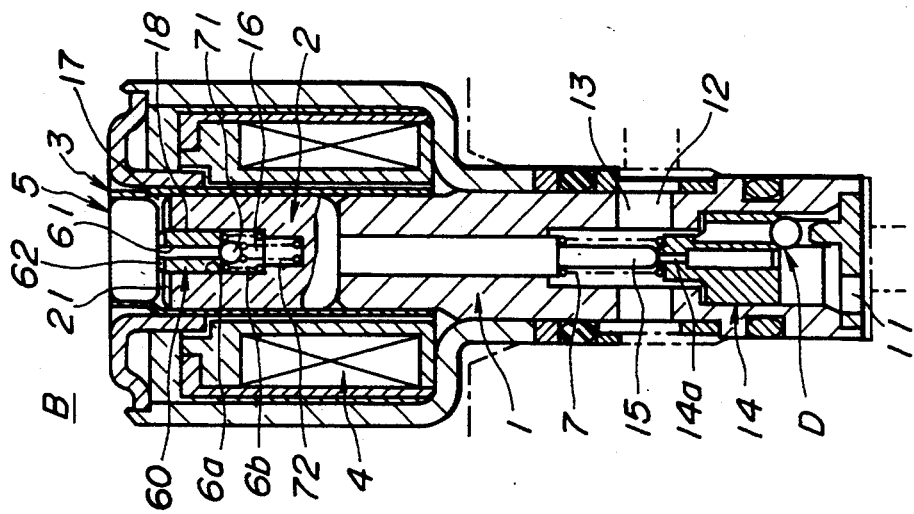
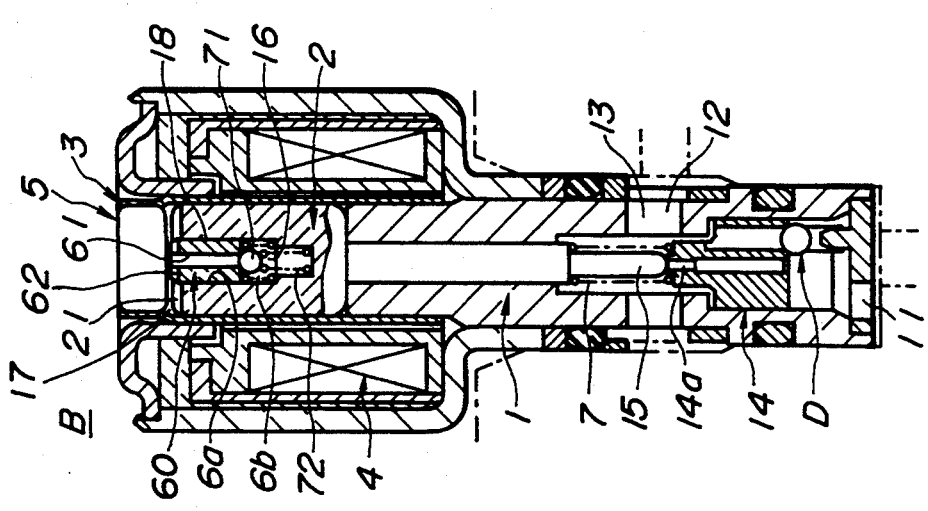
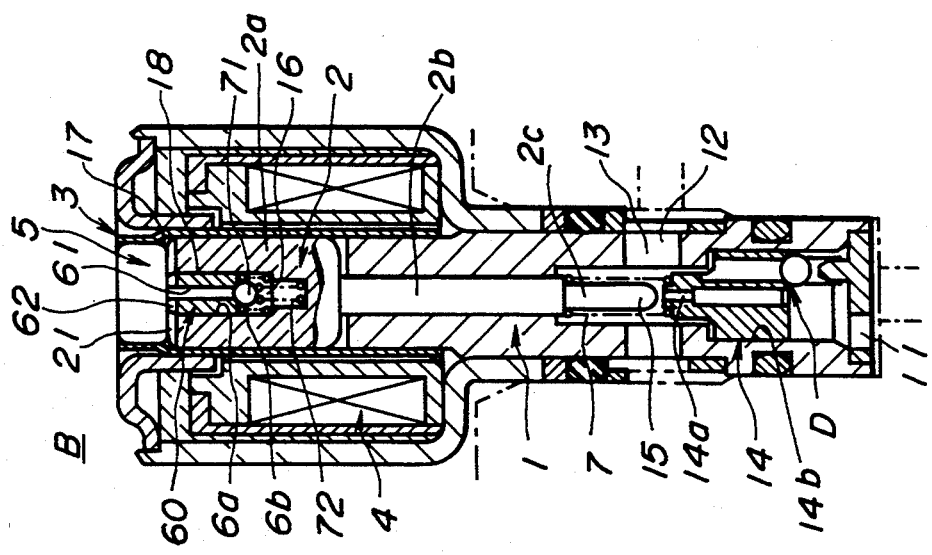

FLUID PRESSURE CONTROL VALVE

BACKGROUND OF THE INVENTION

1. Field of the Invention

The present invention relates to a fluid pressure control valve and particularly to a fluid pressure control valve which is optimally applied to a pressure intensifying valve for an automotive anti-skid brake control system.

2. Description of the Prior Art

As is generally known, an anti-skid brake control system is often employed in large luxury cars and high grade vehicles, for preventing brakes from locking road wheels during quick braking or during braking on a low frictional road surface so as to provide maximum effective braking and consequently to reduce a braking distance. The anti-skid brake control system permits normal application of brakes by alternately holding, reducing, holding, and intensifying the wheel-cylinder pressure, such that braking can be held to just below the point at which a skid would start to develop. In order to accomplish the above three modes, namely a pressure reducing mode, a pressure holding mode, and a pressure intensifying mode, the anti-skid brake control system in general includes a pressure intensifying valve arranged in a main brake fluid line interconnecting a master cylinder and a wheel cylinder and a pressure reducing valve arranged in a brake fluid reflux line which is arranged in parallel with the main brake fluid line. The pressure intensifying valve is generally comprised of a normally open type electromagnetic switching valve serving to establish fluid communication between the outlet port of the master cylinder and the inlet and outlet port of the wheel cylinder through the main brake fluid passage and to block the same fluid communication. On the other hand, the pressure reducing valve is generally comprised of a normally closed type electromagnetic switching valve serving to establish fluid communication between the outlet port of the master cylinder and the port of wheel cylinder through the reflux line and to block the same fluid communication. One such normally open type electromagnetic switching valve applicable to a pressure intensifying valve for an anti-skid brake control system has been disclosed in Japanese Patent First Publication (Tokkai) Heisei 3-41278. The prior art electromagnetic switching valve comprises a valve casing, an electromagnetic solenoid attached to the valve casing in a manner which surrounds the outer periphery of the casing, a substantially cylindrical inner yoke disposed in the casing, a plunger slidably enclosed in the yoke, and a poppet valve axially extending from one end of the plunger for opening and closing an opening (inlet port) which is bored in the yoke to introduce the master-cylinder pressure into the valve, and a return spring operably disposed in the yoke for normally biasing the plunger in a direction wherein the poppet valve is opened. The opening of the valve is closed when the solenoid is energized, while the opening is opened when the solenoid is de-energized. In such conventional normally open type electromagnetic switching valves, the inlet port of the valve is rapidly opened as soon as the solenoid is de-energized. In case that such conventional electromagnetic switching valve is utilized as a pressure intensifying valve for an anti-skid brake control system, there is a possibility of a rapid communication between the master cylinder having a relatively high master-cylinder pressure and the wheel cylinder having a relatively low wheel-cylinder pressure, when the operational mode of the anti-skid brake control system is shifted from a pressure holding mode wherein the pressure reducing valve and the pressure intensifying valve are both closed to a pressure intensifying mode wherein the pressure reducing valve is kept closed and the pressure intensifying valve is switched from a fully closed state to a fully open state. This results in a rapid pressure-drop in the master cylinder and causes surge pressure or pulsation of the brake fluid in the wheel cylinder. The driver feels uncomfortable by kickback in the brake pedal and fluid noise created due to surge. Shift from the pressure reducing mode to the pressure intensifying mode results in the same problem.

SUMMARY OF THE INVENTION

It is, therefore, in view of the above disadvantages, an object of the present invention to provide an improved fluid pressure control valve which can provide a relatively moderate valve opening speed during shifting from a valve closed state to a valve open state.

It is another object of the invention to provide an improved fluid pressure control valve employed in an automotive anti-skid brake control system which can reliably prevent surge in a wheel cylinder, resulting from a rapid fluid communication between the master cylinder and the wheel cylinder just after shifting from a pressure holding or reducing mode to a pressure intensifying mode.

It is a further object of the invention to provide an improved fluid pressure control valve employed in an automotive anti-skid brake control system which can assure a wheel-cylinder pressure moderately intensifying characteristics at a pressure intensifying mode in which the wheel-cylinder pressure is moderately intensified during operation of the anti-skid brake control system, so as to prevent recurrence of wheel-lock due to a rapid pressure rise in the wheel cylinder.

In order to accomplish the aforementioned and other objects of the invention, a fluid-pressure controlling electromagnetic solenoid valve comprises a valve housing having an upstream port and a downstream port, a solenoid attached to the valve housing, a plunger slidably enclosed in the valve housing, the plunger responsive to energizing of the solenoid to block a fluid communication between the two ports, a return spring associated with one end of the plunger, for biasing the plunger in a valve opening direction, a working fluid chamber defined in the valve housing in a manner which faces the other end of the plunger, the working fluid chamber communicating with the downstream port, and dampening means associated with the other end of the plunger, for dampening a motion of the plunger in the valve opening direction. The dampening means may comprise a cylinder defining a piston chamber therein, a piston consisting of non-magnetic material and slidably accommodated in the piston chamber, an orifice via which the working fluid chamber is communicated with the piston chamber, and a spring disposed in the piston chamber for biasing the piston in a direction wherein the volume of the piston chamber is enlarged depending on such a relative movement of the piston to the cylinder that the piston moves outwardly of the cylinder. The cylinder may be formed at the other end of the plunger, while the orifice may comprise an annular aperture defined between the outer peripheral surface of the piston and the inner peripheral surface of the cylinder, by loosely fitting the piston into the cylinder. It is preferable that the plunger, the piston and the cylinder are coaxially aligned with each other. The electromagnetic solenoid valve may further comprise a by-pass passage interconnecting the working fluid chamber and the piston chamber while by-passing the annular orifice, and a one-way check valve being arranged in the by-pass passage for preventing fluid flow from the piston chamber to the working fluid chamber therethrough, the by-pass passage comprising an axial bore formed in the spool, a radially extending groove formed on the other end of the plunger, and a radially extending groove formed on the outer end of the spool.

According to another aspect of the invention, a fluid-pressure controlling electromagnetic solenoid valve comprises a valve housing, a yoke attached to the valve housing, a solenoid attached to the yoke in a manner which surrounds the outer periphery of the yoke, a plunger consisting of magnetic material and slidably enclosed in the yoke, the plunger being formed with a main valve portion which opens the valve when the solenoid is de-energized and closes the valve when the solenoid is energized, a first return spring associated with one end of the plunger, for biasing the plunger in a valve opening direction, a first working fluid chamber defined in the yoke in a manner which faces the other end of the plunger, the first working fluid chamber communicating with a downstream port of the valve, the plunger including a cylindrical portion at the other end thereof, a spool consisting of non-magnetic material and loosely fitted into the cylindrical portion to define an orifice between the inner periphery of the cylindrical portion and the outer periphery of the spool, a second working fluid chamber defined in the cylindrical portion in a manner which faces the inner end of the spool; the second working fluid chamber being communicated with the first working fluid chamber via the orifice, a second return spring associated with the inner end of the spool, for biasing the spool in an outwardly projecting direction. Thus, the spool and the cylindrical portion are cooperative to each other to dampen a motion of the plunger in the valve opening direction. The electromagnetic solenoid valve may further comprise a by-pass passage interconnecting the first and second working fluid chambers while by-passing the orifice, and a one-way check valve being arranged in the by-pass passage for preventing fluid flow from the second working fluid chamber to the first working fluid chamber therethrough. The by-pass passage may comprise an axial bore formed in the spool, a radially extending groove formed on the other end of the plunger, and a radially extending groove formed on the outer end of the spool. It is preferable that the spool and the plunger are coaxially aligned with each other.

According to a further aspect of the invention, a pressure intensifying two-position two-port electromagnetic solenoid valve for an automotive anti-skid brake control system, the valve comprises a valve housing having a first port leading to an outlet port of a master cylinder and a second port leading to a port of a wheel cylinder, a substantially cylindrical yoke attached to the valve housing, a solenoid attached to the yoke in a manner which surrounds the outer periphery of the yoke, a substantially cylindrical plunger consisting of magnetic material and slidably and loosely fitted into the yoke to define an annular fluid passage between the outer periphery of the plunger and the inner periphery of the yoke, the plunger being formed with a main valve portion which closes the valve only when the solenoid is energized, a first return spring associated with one end of the plunger, for biasing the plunger in a valve opening direction, a first working fluid chamber defined in the yoke in a manner which faces the other end of the plunger; the first working fluid chamber communicating through the annular fluid passage with the second port, the plunger including a cylindrical portion at the other end thereof, a spool loosely fitted into the cylindrical portion to define an orifice between the inner periphery of the cylindrical portion and the outer periphery of the spool, a second working fluid chamber defined in the cylindrical portion in a manner which faces the inner end of the spool, the second working fluid chamber being communicated with the first working fluid chamber via the orifice, a second return spring associated with the inner end of the spool, for biasing the spool in an outwardly projecting direction, whereby the spool and the cylindrical portion are cooperative to each other to assure a wheel-cylinder pressure moderately intensifying characteristics by dampening a motion of the plunger in the valve opening direction, during operation of the anti-skid brake control system.

BRIEF DESCRIPTION OF THE DRAWINGS

FIGS. 3A, 3B, and 3C are longitudinal cross-sectional views respectively illustrating different states of a fluid pressure control valve of a second embodiment.

DESCRIPTION OF THE PREFERRED EMBODIMENTS

First embodiment

Figure 1A:
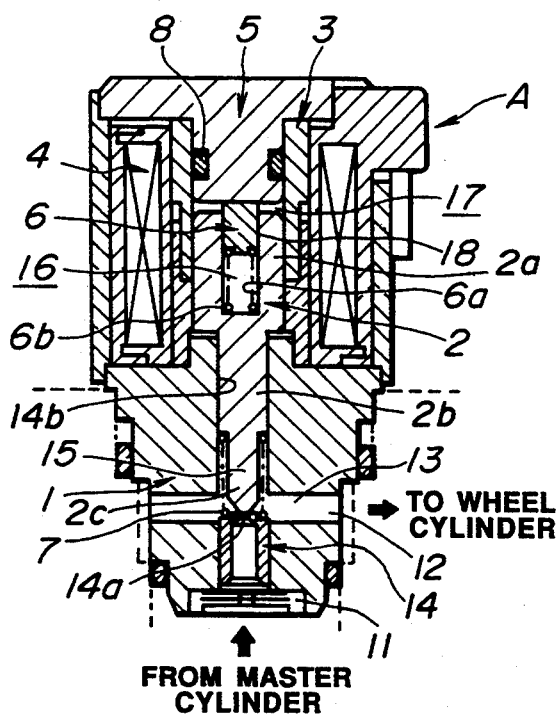
FIG. 1A is a longitudinal cross-sectional view illustrating a first embodiment of a fluid pressure control valve being in a valve closed state corresponding to a solenoid energized state.
Figure 1B:
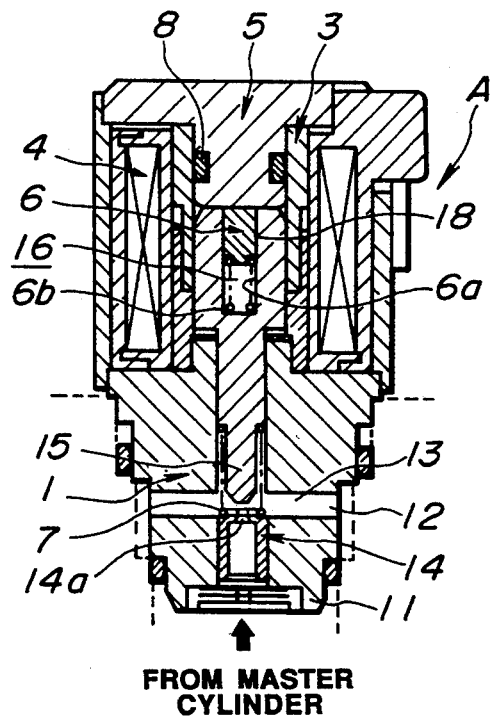
FIG. 1B is a longitudinal cross-sectional view illustrating the fluid pressure control valve of the first embodiment being in a valve open state corresponding to a solenoid de-energized state.
Figure 2:
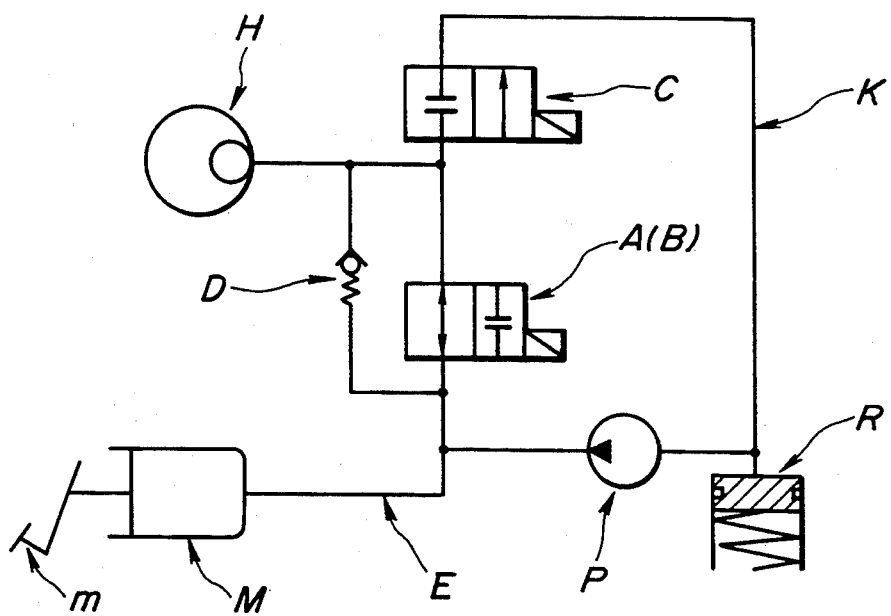
FIG. 2 is a schematic circuit diagram illustrating an anti-skid brake control valve employing the pressure control valve of the first embodiment.

Referring now to the drawings, particularly to FIGS. 1A, 1B and 2, the fluid pressure control valve A of the first embodiment is exemplified in case of a pressure intensifying valve suitable for an automative anti-skid brake control system as shown in FIG. 2. As seen in FIG. 2, the anti-skid brake control system generally abbreviated as an "ABS" includes a main brake fluid line E arranged for introducing a master-cylinder pressure which is generated in a master cylinder M depending on depression of a brake pedal m, into a wheel cylinder H. The ABS includes a brake fluid reflux line K arranged in parallel with the main line E, a brake-fluid reservoir R, and a so-called ABS pump P. A pressure reducing valve C is arranged in the reflux line K, for returning the brake fluid in the wheel cylinder H to the master cylinder side and consequently to reduce the wheel-cylinder pressure. Reference numeral D designates a by-pass check valve fluidly disposed in a by-pass line being arranged in parallel with the pressure intensifying valve A, for by-passing the brake fluid in the wheel cylinder H to quickly return the brake fluid in the wheel cylinder H to the master cylinder side when the brakes are released. During operation of the ABS, the pressure intensifying valve A and the pressure reducing valve C are cooperative to each other, to provide a pressure reducing mode by closing the valve A and by opening the valve C, a pressure holding mode by closing both the valves A and C, and a pressure intensifying mode by opening the valve A and by closing the valve C. As is well known, the ABS comes into operation if an electronic control unit (not shown) detects that the road wheel is locked during quick braking or during braking on a low frictional road surface. At the beginning of the anti-skid brake control, the ABS operates in the pressure reducing mode in which the brake fluid in the wheel cylinder H is temporarily stored in the brake-fluid reservoir R upon opening of valve C and, thereafter, the ABS pump is driven to return the brake fluid in the reservoir to the upstream junction between the reflux line K and the main brake fluid line E and consequently to reduce the wheel-cylinder pressure. Thereafter, when the wheel-cylinder pressure is reduced to a predetermined pressure level, the operational mode is shifted from the pressure reducing mode to the pressure holding mode to maintain the wheel-cylinder pressure at the predetermined level. Subsequently to the above, as soon as the control unit detects that the road wheel has been unlocked during operation of the ABS, the operational mode is switched from the pressure holding mode to the pressure intensifying mode, with the result that the brake fluids are supplied to the wheel cylinder H from both the reflux line K and the master cylinder M. Thus, the wheel-cylinder pressure is intensified again. In this manner, the wheel-cylinder pressure is suitably adjusted by means of the ABS to prevent wheel-lock and provide maximum effective braking. In the first embodiment, the pressure control valve A serving as the pressure intensifying valve for the ABS is comprised of a normally open type, two-position two-port electromagnetic solenoid valve.

Referring to FIGS. 1A and 1B, the pressure control valve A of the first embodiment includes a valve housing 1 having a first port 11 leading to the outlet port of the master cylinder and a second port 12 leading to the inlet and outlet port of the wheel cylinder, and a fluid passage 13 interconnecting the two ports 11 and 12. The first port 11 essentially corresponds to an upstream port, while the second port 12 essentially corresponds to a downstream port. The valve housing 1 also includes an axially extending bore 14b bored therein in a manner so as to penetrate the fluid passage 13. A substantially cylindrical valve seat 14 is press-fitted into the axial bore 14b upstream of the fluid passage 13. The valve seat 14 has an opening 14a via which the fluid passage 13 is communicated with the first port 11. Slidably disposed in the axial bore 14b is a plunger 2 consisting of magnetic material. As shown in FIGS. 1A and 1B, the plunger 2 comprises a relatively large-diameter upper section 2a, an intermediate section 2b, and a relatively small-diameter lower section 2c. The upper section 2a is slidably guided by a substantially cylindrical yoke 3 attached to the upper portion of the housing 1. The intermediate section 2b is slidably enclosed in the axial bore 14b of the housing 1. The lower section 2c serves as a main valve portion 15 for opening and closing the opening 14a. A substantially annular electromagnetic solenoid 4 is disposed in a manner which surrounds the outer periphery of the yoke 3. When the solenoid 4 is energized, the solenoid acts to attract the plunger 2 in a downward direction (viewing FIGS. 1A and 1B), so that the opening 14a is fully closed through abutment between the top end of the main valve portion 15 and the valve seat 14. The plunger 2 is normally biased in an upward direction by the bias of a return spring 7 sandwiched between the stepped portion defined between the intermediate section 2b and the lower section 2c and the upper end of the valve seat 14. Reference numeral 5 designates a plug arranged for hermetically covering the upper opening of the cylindrical yoke 3. Reference numeral 8 designates a seal ring disposed between the yoke 3 and the plug 5, for sealing an aperture defined between the inner peripheral surface of the yoke 3 and the outer peripheral surface of the plug 5 in a fluid-tight fashion. A first working fluid chamber 17 is defined between the bottom end of the plug 5 and the upper end of the plunger 2, so as to permit the axially sliding movement of the plunger 2. The relatively large-diameter upper section 2a of the plunger includes an axial bore 6a which slidably encloses a spool 6 consisting of non-magnetic material. The spool 6 is loosely fitted into the axial bore 6a to define an essentially annular orifice 18 between the inner peripheral surface of the axial bore 6a and the outer peripheral surface of spool 6. A second working fluid chamber 16 is defined between the bottom end of the spool 6 and the inner wall of the axial bore 6a. A return spring 6b is disposed in the second working fluid chamber 16, for normally biasing the spool 6 in an upward direction (viewing in FIG. 1A) in which the upper end of the spool abuts the bottom end of the plug 5. Although it is not clearly shown in FIGS. 1A and 1B, the upper section 2a of the plunger is loosely fitted into the yoke 3 and in addition the intermediate section 2b of the plunger is loosely fitted into the axial bore 14b of the housing 1. Thus, annular fluid passages are respectively defined between the outer peripheral surface of the intermediate section 2b of the plunger and the inner peripheral surface of the axial bore 14b of the housing 1, and between the outer peripheral surface of the large-diameter upper section 2a of the plunger and the inner peripheral surface of the cylindrical yoke 3. In this construction of the fluid passage, the fluid passage 13 is constantly communicated through the previously noted annular fluid passages with the above-mentioned first working fluid chamber 17. Thus, the first working fluid chamber 17 is filled with the brake fluid introduced from the fluid passage 13 through the annular fluid passages, while the above-mentioned second working fluid chamber 16 is filled with the brake fluid introduced from the first chamber 17 through the annular orifice 18. The bias of the spring 6b is designed to be lower than the bias of the spring 7. As shown in FIG. 1A, the lowermost position of the plunger 2 is restricted by abutment between the lower end of the main valve portion 15 and the valve seat 14. As shown in FIG. 1B, the uppermost position of the plunger 2 is restricted by abutment between the bottom end of the plug 5 and the upper end of the plunger 2. With the previously described arrangement, the pressure control valve A of the first embodiment operates as follows.

When the solenoid 4 is de-energized, the plunger 2 is maintained in the uppermost position illustrated in FIG. 1B, by the bias of the spring 7, with the result that the upper ends of the plunger 2 and the spool 6 abuts the bottom end of the plug 5 and that the opening 14a of the pressure control valve A is fully opened. Thus, the first port 11 is fully communicated through the opening 14a with the second port 12.

Subsequently, when the solenoid 4 is energized, the plunger 2 is moved toward the lowermost position by attraction of the solenoid, with the result that the opening 14a of the pressure control valve A is fully closed by the main valve portion 15. At this time, the spool tends to move upwards by the bias of the spring 6b, depending on the downward movement of the plunger 2. Actually, the spool 6 is not quickly shifted upwards through an orifice constriction of the annular orifice 18, but moderately shifted outwardly of the axial bore 6a, i.e., in an upward direction (viewing FIG. 1A), after the spool has once moved downwards substantially according to the downward movement of the plunger. In this manner, with a slight time lag, the spool 6 consisting of non-magnetic material is positioned in the uppermost position (a spring set position as shown in FIG. 1A) wherein the upper end of the spool 6 abuts the bottom of the plug 5. In accordance with the upward movement of the spool 6, the volume of the second chamber 16 becomes enlarged gradually with the above slight time lag. Thereafter, when the operational mode of the valve A is shifted again from the solenoid ON state to the solenoid OFF state, the plunger 2 tends to return upwards by the bias of the spring 7. The upward movement of the spool 6 is restricted by abutment between the bottom of the plug 5 and the upper end of the spool 6, and thus the spool 6 tends to move inwardly of the axial bore 6a, depending on the upward movement of the plunger 2. However, the working fluid in the second chamber 16 does not smoothly flow to the first chamber 17, because the outgoing fluid flow from the second chamber 16 to the first chamber 17 is restricted through an orifice constriction of the orifice 18. As a result, a smooth upwardly sliding movement of the plunger is suppressed. In other words, the volume of the second chamber 16 is moderately reduced due to a restricted inward movement of the spool 6 in relation to the axial bore 6a, and thus the upwardly sliding speed of the plunger is reduced. Accordingly, the opening 14a of the valve A is moderately opened on the basis of a relatively moderate sliding speed of the plunger. As appreciated from the above, when shifting from the solenoid ON state to the solenoid OFF state, the spool 6 loosely fitted into the axial bore 6a acts like a piston of a dash pot serving to dampen an upward motion of the plunger 2, and the large-diameter section 2a of the plunger having the axial bore 6a acts like a cylinder defining a piston chamber of the dash pot, and the annular aperture 18 acts like an orifice of the dash pot.

Second Embodiment

Referring now to FIGS. 3A, 3B and 3C, there are shown the second embodiment of the fluid pressure control valve applicable to an automotive anti-skid brake control system. The basic construction of the fluid pressure control valve B of the second embodiment as shown in FIGS. 3A, 3B and 3C is similar to that of the first embodiment as shown in FIGS. 1A and 1B. Therefore, the same reference numerals used in the first embodiment of FIGS. 1A and 1B will be applied to the corresponding elements used in the second embodiment of FIGS. 3A, 3B and 3C, for the purpose of comparison between the first and second embodiments. The second embodiment is different from the first embodiment in that a fluid communication between the first and second chambers 17 and 16 is achieved via the orifice 18 and via a by-pass passage as hereinafter described in detail.

Referring to FIG. 3A, the fluid pressure control valve B of the second embodiment includes an essentially cylindrical spool 60 having an axially extending communication passage 61 therein, and a ball valve 71 arranged in the second chamber 16 for normally blocking a fluid communication between the first and second chambers via the communication passage 61. In the second embodiment, although the ball valve 71 is utilized for normally closing the downward opening of the communication passage 61, a poppet valve may be replaced with the ball valve. The ball valve 71 is normally biased by means of a return spring 72 in an upward direction (viewing FIG. 3A) to close the downward opening of the communication passage 61. As seen in FIG. 3A, a radially extending communication groove 21 is formed on the upper surface of the relatively large-diameter section of the plunger 2, while a radially extending communication groove 62 is formed on the upper surface of the spool 6. The two radial grooves 21 and 62 are cooperative to each other in such a manner as to constantly intercommunicate the first chamber 17 and the communication passage 61, irrespective of the axial position of the plunger 2, that is, even when the upper end of the plunger 2 abuts the bottom of the plug 5. As appreciated from the above, the communication passage 61, and the two communication grooves 62 and 21 define a by-pass passage being arranged in parallel with the orifice passage comprising the annular orifice 18. The ball valve 71 acts as a one-way check valve serving to block a fluid flow of working fluid flowing from the second chamber 16 via the communication passage 61 to the first chamber 17 and to permit the opposing fluid flow from the first chamber 17 to the second chamber 16. In the second embodiment, the by-pass check valve D is integrally formed with the valve seat 14. The pressure control valve B of the second embodiment operates as follows.

FIG. 3A shows a condition of the valve B in which the solenoid is de-energized. Under this condition, the plunger 2 is biased upwardly by means of the spring 7 and thus the upper end of the plunger 2 and the upper end of the spool 60 both abut the bottom of the plug 5, with the result that the opening 14a of the valve B is fully opened. Thereafter, as soon as the solenoid valve B is shifted from the solenoid OFF state to the solenoid ON state, the plunger 2 consisting of magnetic material is moved downwards by attraction of the energized solenoid 4, as shown in FIG. 3B. As clearly seen in FIG. 3B, at the beginning of energizing of the solenoid 4, the outwardly sliding movement of the spool 60 consisting of non-magnetic material tends to be restricted through the orifice constriction of the orifice 18. However, since the spool 60 employed in the pressure control valve B has the above-noted additional by-pass passage as well as the orifice passage defined by the orifice 18, a sufficient fluid communication between the first and second chambers 17 and 16 can be achieved through the by-pass passage. That is, when the fluid pressure in the second chamber 16 is reduced depending on the outward movement of the spool 60 in relation to the axial bore 6a, the fluid pressure in the first chamber 17 exceeds that in the second chamber 16. Due to the pressure difference between the first and second chambers 17 and 16, the ball valve 71 is opened, with the result that the working fluid is smoothly introduced from the first chamber 17 via the communication passage 61 to the second chamber 16. Therefor, the spool 60 quickly returns to a spring set position as shown in FIG. 3C. As appreciated from the above, the spool 60 of the second embodiment can be more quickly returned to its spring set position, when compared with the spool 6 of the first embodiment. Subsequently, when the solenoid is de-energized again, the plunger 2 is pushed upwards by the bias of the spring 7. Since the upward movement of the spool 60 is restricted by abutment between the bottom of the plug 5 and the upper end of the spool 60, the spool 60 itself tends to move inwardly of the axial bore 6a, depending on the upwardly sliding movement of the plunger. As a result, since the second chamber 16 is compressed by the lower end of the spool 60, and whereby the fluid pressure in the second chamber 16 becomes greater than that in the first chamber 17. Due to the pressure difference, the ball valve 71 is strongly pushed onto the bottom of the spool 60, with the result that the communication passage 61 is fully closed. Under this condition, the working fluid in the second chamber 16 is slowly introduced into the first chamber 17 via the orifice 18. In this manner, the upwardly sliding movement of the plunger 2 is reduced by damping action of the spool 60 loosely fitted into the axial bore 6a.

As will be appreciated from the above, if the fluid pressure control valves A or B as explained in the first and second embodiments is applied for a pressure intensifying valve for the ABS, the pressure control valve according to the invention can assure a wheel-cylinder pressure moderately intensifying characteristics during operating of the ABS, because the valve is designed to be quickly closed and slowly opened. The valve opening speed can be determined depending on an area of fluid flow passage of the orifice 18. According to the first and second embodiments, the pressure control valve utilized as the pressure intensifying valve of the ABS can reliably prevent surge pressure in a wheel cylinder and reduce fluid noise resulting from the surge. Specifically, the pressure control valve B of the second embodiment can more reliably exhibit the wheel-cylinder pressure moderately intensifying characteristics, regardless of a relatively short shifting cycle from the ABS pressure reducing or pressure holding mode to the ABS pressure intensifying mode, because of a quick recovery of the spool to its spring set position. Additionally, in the first and second embodiments, the axially extending boss-like portion of the plug 5, the spool 6 or 60, and the plunger 2 are coaxially aligned to each other, so as to effectively restrict the upwardly sliding movement of the plunger 2 towards the spring set position. Additionally, since the first chamber 17 is constantly communicated with the communication passage 61 (the axial bore of the spool) via the radial grooves 21 and 61, these grooves 21 and 61 ensure superior recovery of the spool 60 to the spring set position.

In the previously explained embodiments, although a good serving as a damper is slidably enclosed in an axial bore defined in a plunger, such a spool having the same function may be slidably arranged in a plug facing the upper end of the plunger. In this case, a sliding movement of the plunger towards its spring set position is restricted by abutment between the upper end of the plunger and the lower end of the spool. In addition to the above, the second worker fluid chamber may be also defined in the plug.

Furthermore, although a fluid flow from a second working fluid chamber to a first working fluid chamber is constricted by an orifice comprising an annular aperture defined between the outer peripheral surface of the spool and the inner peripheral wall of the axial bore defined in the plunger, any orifices having a different shape in the cross-section may bring the same orifice constriction. For example, one such orifice may be an axially extending orifice groove formed on the inner peripheral wall of the axial bore of the plunger.

Moreover, in the preferred embodiment, although the valve housing and the yoke are separately formed, these members may be integrally formed with each other.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A fluid-pressure controlling electromagnetic solenoid valve comprising:
   a valve housing having an upstream port and a downstream port;
   a solenoid attached to said valve housing;
   a plunger slidably enclosed in said valve housing, said plunger responsive to energizing of said solenoid to block a fluid communication between said two ports;
   a return spring associated with one end of said plunger, for biasing said plunger in a valve opening direction;
   a working fluid chamber defined in said valve housing in a manner which faces the other end of said plunger; said working fluid chamber communicating with said downstream port; and
   a dash-pot dampener associated with the other end of said plunger, said dash-pot dampener generating a damping force to dampen a motion of said plunger in the valve opening direction.

2. The electromagnetic solenoid valve as set forth in claim 1, wherein said dampener comprises a cylinder defining a piston chamber therein, a piston consisting of non-magnetic material and slidably accommodated in said piston chamber, an orifice via which said working fluid chamber is communicated with said piston chamber, and a spring disposed in said piston chamber for biasing said piston in a direction wherein the volume of said piston chamber is enlarged depending on such a relative movement of said piston to said cylinder that said piston moves outwardly of said cylinder.

3. The electromagnetic solenoid valve as set forth in claim 2, wherein said cylinder is formed at the other end of said plunger, and said orifice comprises an annular aperture defined between the outer peripheral surface of said piston and the inner peripheral surface of said cylinder, such that said piston is loosely fitted into said cylinder.

4. The electromagnetic solenoid valve as set forth in claim 3, wherein said plunger, said piston and said cylinder are coaxially aligned with each other.

5. The electromagnetic solenoid valve as set forth in claim 3, further comprising a by-pass passage interconnecting said working fluid chamber and said piston chamber while by-passing said annular orifice, and a one-way check valve being arranged in said by-pass passage for preventing fluid flow from said piston chamber to said working fluid chamber therethrough, said by-pass passage comprising an axial bore formed in said spool, a radially extending groove formed on the other end of said plunger, and a radially extending groove formed on the outer end of said spool.

6. A fluid-pressure controlling electromagnetic solenoid valve comprising:

a valve housing;

a yoke attached to said valve housing;

a solenoid attached to said yoke in a manner which surrounds the outer periphery of said yoke;

a plunger consisting of magnetic material and slidably enclosed in said yoke, said plunger being formed with a main valve portion which opens said valve when said solenoid is de-energized and closes said valve when said solenoid is energized;

a first return spring associated with one end of said plunger, for biasing said plunger in a valve opening direction;

a first working fluid chamber defined in said yoke in a manner which faces the other end of said plunger; said first working fluid chamber communicating with a downstream port of said valve;

said plunger including a cylindrical portion at the other end thereof;

a spool consisting of non-magnetic material and loosely fitted into said cylindrical portion to define an orifice between the inner periphery of said cylindrical portion and the outer periphery of said spool;

a second working fluid chamber defined in said cylindrical portion in a manner which faces the inner end of said spool; said second working fluid chamber being communicated with said first working fluid chamber via said orifice;

a second return spring associated with the inner end of said spool, for biasing said spool in an outwardly projecting direction;

whereby said spool and said cylindrical portion are cooperative to each other to dampen a motion of said plunger in the valve opening direction.

7. The electromagnetic solenoid valve as set forth in claim 6, further comprising a by-pass passage interconnecting said first and second working fluid chambers while by-passing said orifice, and a one-way check valve being arranged in said by-pass passage for preventing fluid flow from said second working fluid chamber to said first working fluid chamber therethrough.

8. The electromagnetic solenoid valve as set forth in claim 7, said by-pass passage comprises an axial bore formed in said spool, a radially extending groove formed on the other end of said plunger, and a radially extending groove formed on the outer end of said spool.

9. The electromagnetic solenoid valve as set forth in claim 8, said spool and said plunger are coaxially aligned with each other.

10. A pressure intensifying two-position two-port electromagnetic solenoid valve for an automotive anti-skid brake control system, said valve comprising:

a valve housing having a first port leading to an outlet port of a master cylinder and a second port leading to a port of a wheel cylinder;

a substantially cylindrical yoke attached to said valve housing;

a solenoid attached to said yoke in a manner which surrounds the outer periphery of said yoke;

a substantially cylindrical plunger consisting of magnetic material and slidably and loosely fitted into said yoke to define an annular fluid passage between the outer periphery of said plunger and the inner periphery of said yoke, said plunger being formed with a main valve portion which closes said valve only when said solenoid is energized;

a first return spring associated with one end of said plunger, for biasing said plunger in a valve opening direction;

a first working fluid chamber defined in said yoke in a manner which faces the other end of said plunger; said first working fluid chamber communicating through said annular fluid passage with said second port;

said plunger including a cylindrical portion at the other end thereof;

a spool loosely fitted into said cylindrical portion to define an orifice between the inner periphery of said cylindrical portion and the outer periphery of said spool;

a second working fluid chamber defined in said cylindrical portion in a manner which faces the inner end of said spool; said second working fluid chamber being communicated with said first working fluid chamber via said orifice;

a second return spring associated with the inner end of said spool, for biasing said spool in an outwardly projecting direction;

whereby said spool and said cylindrical portion are cooperative to each other to assure a wheel-cylinder pressure moderately intensifying characteristics by dampening a motion of said plunger in the valve opening direction, during operation of the anti-skid brake control system.

11. A fluid-pressure controlling electromagnetic solenoid valve comprising:

a valve housing having an upstream port and downstream port;

a solenoid attached to said valve housing;

a plunger slidably enclosed in said valve housing, said plunger responsive to energizing of said solenoid to block a fluid communication between said two ports;

a return associated with said one end of said plunger, for biasing said plunger in a valve opening direction;

a working fluid chamber defined in said valve housing in a manner which faces the other end of said plunger; said working fluid chamber communicating with said downstream port; and a dash-pot dampening means associated with the other end of said plunger, for dampening a motion of said plunger in the valve opening direction, wherein said plunger is formed with a cylinder at the other end, said cylinder defining therein a piston chamber, and wherein said dampening means comprises a piston consisting of non-magnetic material and slidably accommodated in said piston chamber, an orifice via which said working fluid chamber is communicated with said piston chamber, and a spring disposed in said piston chamber for biasing said piston in a direction wherein the volume of said piston chamber is enlarged depending on such a relative movement of said piston to said cylinder that said piston moved outwardly of said cylinder.

12. The electromagnetic solenoid valve as set forth in claim 11, said orifice comprises an annular aperture defined between the outer peripheral surface of said piston and the inner peripheral surface of said cylinder, such that said piston is loosely fitted in said cylinder.

13. A fluid-pressure controlling electromagnetic solenoid valve comprising:

a valve housing having an upstream port and downstream port;

a solenoid attached to said valve housing;

a plunger slidably enclosed in said valve housing, said plunger responsive to energizing of said solenoid to block a fluid communication between said two ports;

a return spring associated with said one end of said plunger, for biasing said plunger in a valve opening direction;

a working fluid chamber defined in said valve housing in a manner which faces the other end of said plunger; said working fluid chamber communicating with said downstream port; and a dash-pot dampening means for dampening a motion of said plunger in the valve opening direction, said dampening means including a spring-loaded piston which piston is loosely fitted to move slowly in a cylinder containing working fluid so that an outwardly projecting portion of said piston is in contact with the other end of said plunger, said spring-loaded piston being cooperative with said cylinder for defining a variable volume chamber whose volume is enlarged depending on such a relative movement of said piston to said cylinder that said piston moves outwardly of said cylinder.

14. A fluid-pressure controlling electromagnetic solenoid valve comprising:

a valve housing having an upstream port and a downstream port;

a solenoid attached to said valve housing;

a plunger slidably enclosed in said valve housing, said plunger responsive to energizing of said solenoid to block a fluid communication between said two ports;

a return spring associated with one end of said plunger, for biasing said plunger in a valve opening direction;

a working fluid chamber defined in said valve housing in a manner which faces the other end of said plunger; said working fluid chamber communicating with said downstream port; and dampening means associated with the other end of said plunger, for dampening a motion of said plunger in the valve opening direction, wherein said dampening means comprises a cylinder defining a piston chamber therein, a piston consisting of non-magnetic material and slidably accommodated in said piston chamber, an orifice via which said working fluid chamber is communicated with said piston chamber, and a spring disposed in said piston chamber for biasing said piston in a direction wherein the volume of said piston chamber is enlarged depending on such a relative movement of said piston to said cylinder that said piston moves outwardly of said cylinder.

* * * * *